United States Patent [19]

Hamasaka et al.

[11] Patent Number: 5,485,439
[45] Date of Patent: Jan. 16, 1996

[54] METHOD FOR RECORDING/REPRODUCING INFORMATION AND APPARATUS THEREFOR

[75] Inventors: Hiroshi Hamasaka, Nishinomiya; Isao Satoh, Neyagawa; Yoshihisa Fukushima, Osaka; Yuji Takagi, Hirakata; Yasushi Azumatani, Neyagawa, all of Japan

[73] Assignee: Matsushita Electric Industrial Co., Ltd., Osaka, Japan

[21] Appl. No.: 785,296

[22] Filed: Oct. 30, 1991

[30] Foreign Application Priority Data

Oct. 30, 1990 [JP] Japan ................................. 2-293831
Nov. 30, 1990 [JP] Japan ................................. 2-337927
Jul. 4, 1991 [JP] Japan ................................. 3-164320

[51] Int. Cl.$^6$ .................................................. G11B 7/00
[52] U.S. Cl. ................................ 369/47; 369/54; 369/58; 369/50
[58] Field of Search ............................. 369/47, 50, 53, 369/54, 58, 48; 395/425, 600; 360/27

[56] References Cited

U.S. PATENT DOCUMENTS 4,811,124 3/1989 Dujari et al. ............................. 369/54 X
5,136,569 8/1992 Fennema et al. ........................ 369/53 X

FOREIGN PATENT DOCUMENTS 60-124727 7/1985 Japan .

OTHER PUBLICATIONS

Apple Computer, Inc., Macintosh SE User's Manual, 1987 (no month) pp. 126, 172, 180, 208, and 210.

*Primary Examiner*—W. R. Young
*Attorney, Agent, or Firm*—Ratner & Prestia

[57] ABSTRACT

A method and apparatus for recording/reproducing information on an optical disk using the UNIX operating system. The optical disk has a plurality of partitions. An open table is provided to prevent the removal of the optical disk when the optical disk device is in use. The open table manages the use situation of the plurality of partitions. The optical disk is prohibited from being removed from the optical disk device when one partition is opened earlier than the other partitions. The removal prohibition of the optical disk is released when the final partition is closed.

3 Claims, 13 Drawing Sheets

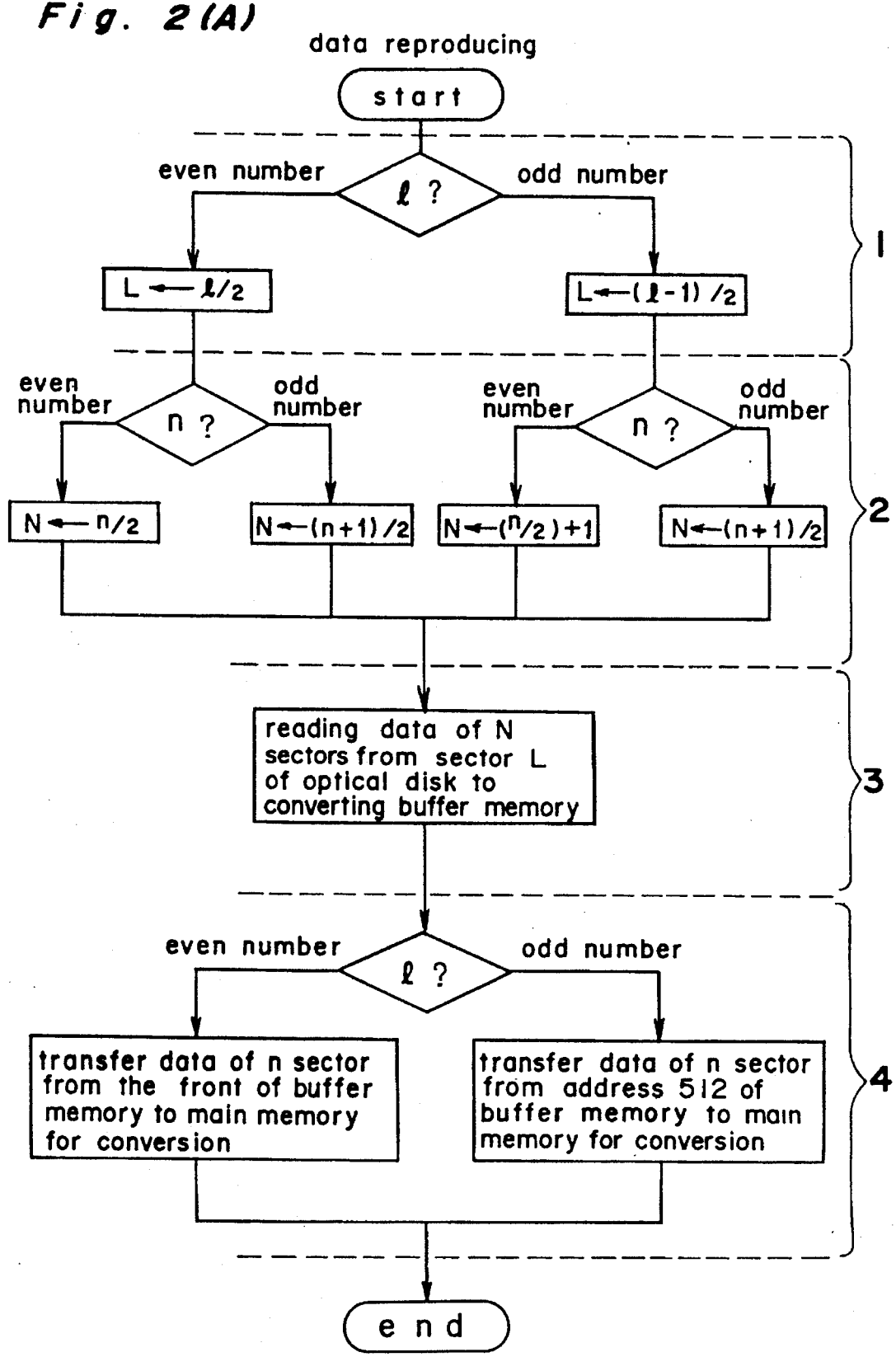

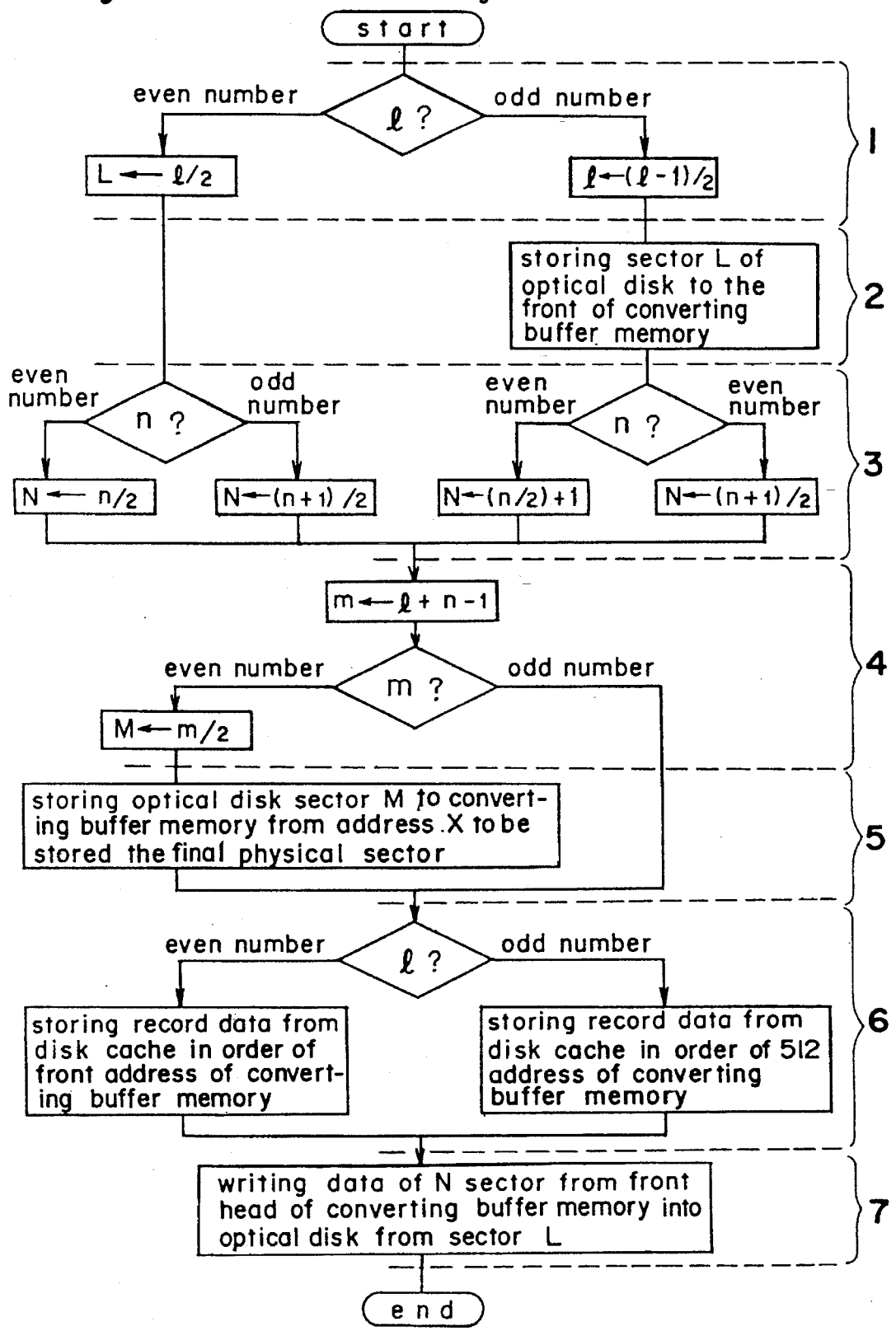
Fig. 2(B) data recording

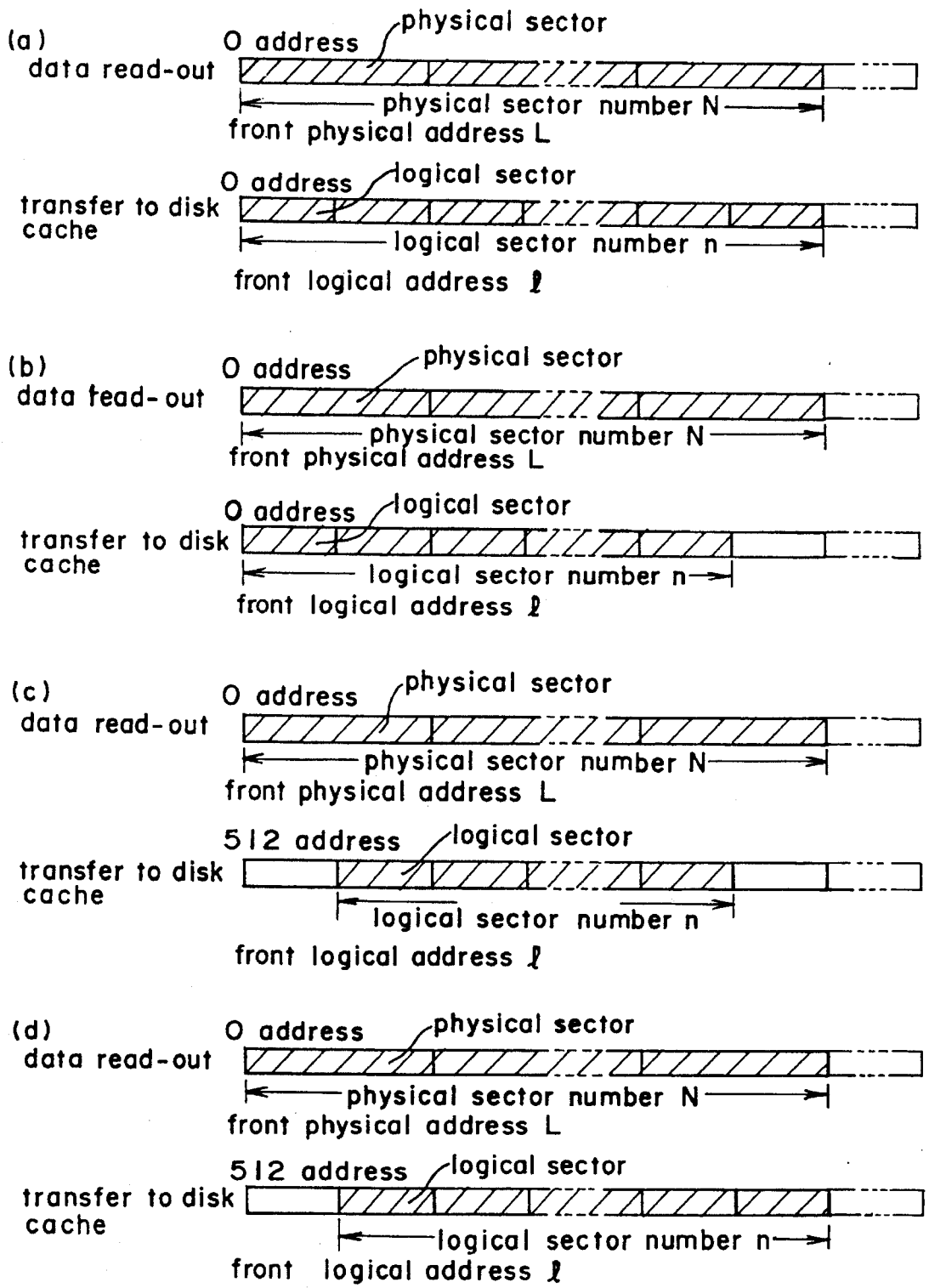

| a | b | c |
|---|---|---|
| close | close | close |

(b)

| a | b | c |
|---|---|---|
| open | close | close |

(c)

| a | b | c |
|---|---|---|
| open | open | close |

(d)

| a | b | c |
|---|---|---|
| close | open | close |

(e)

| a | b | c |
|---|---|---|
| close | close | close |

(f)

| a | b | c |
|---|---|---|
| open | close | close |

(g)

| a | b | c |
|---|---|---|
| close | close | close |

Fig. 7

|   | 4031 | 4032 | 4033 |
|---|---|---|---|
| (a) | a | b | c |
|   | non-use | non-use | non-use |

| (b) | a | b | c |
|---|---|---|---|
|   | in use | non-use | non-use |

| (c) | a | b | c |
|---|---|---|---|
|   | in use | in use | non-use |

| (d) | a | b | c |
|---|---|---|---|
|   | non-use | in use | non-use |

| (e) | a | b | c |
|---|---|---|---|
|   | non-use | non-use | non-use |

| (f) | a | b | c |
|---|---|---|---|
|   | in use | non-use | non-use |

| (g) | a | b | c |
|---|---|---|---|
|   | non-use | non-use | non-use |

4031  open flag of a partition
4032  open flag of b partition
4033  open flag of c partition

METHOD FOR RECORDING/REPRODUCING INFORMATION AND APPARATUS THEREFOR

BACKGROUND OF THE INVENTION

1. Field of the Invention

The present invention relates to a method and an apparatus for recording/reproducing information in which an optical disk is used as an information recording medium.

2. Description of the Prior Art

The operation of a conventional information recording reproducing apparatus is described below.

FIG. 8 is a construction view showing the conventional information recording reproducing apparatus, using UNIX as an operating system, in which a host system 8100 is connected with a magnetic disk device 8200 serving as an external memory via a system bus 8300.

The host system 8100 comprises a CPU 8101, a main memory 8102, a disk cache 8103, and an interface circuit 8104. The main memory 8102 stores a plurality of programs and data. The CPU 8101 reads out the data and the programs stored in the main memory 8102 into execution. The disk cache 8103 is a memory for making input/output processings at a high speed. The input and output of data between the host system 8100 and the external memory is carried out via the disk cache 8103. The interface circuit 8104 connects the host system 8100 to the system bus 8300.

The magnetic disk device 8200 accommodates an information recording medium 8201. The information recording medium 8201 is logically divided into three partitions a, b, and c and a file system is constructed in each partition.

The recording reproducing operation of the data in the conventional information recording reproducing of the above construction is described below.

The CPU 8101 reads out the program from the main memory 8102 into an execution. When the writing of data on the partition (a) of the information recording medium 8201 is necessary in this process, the CPU 8101 opens the partition (a) in read/write mode. In the open processing, the CPU 8101 reads out the management information required in controlling the file from the information recording medium 8201 via the interface circuit 8104.

Next, the CPU 8101 records data in the partition (a) of the information recording medium 8201. In the write processing of data, first, the CPU 8101 transfers data to be written to the disk cache 8103 from the main memory 8102.

When the CPU 8101 records the data from the main memory 8102 onto the information recording medium 8201, well-known write-back method is used. In this method, when data writing is required, the CPU 8101 stores data to be written into the information recording medium 8201 in the disk cache 8103. Then, the CPU 8101 writes the data stored in the disk cache 8103 into the information recording medium 8201 when a vacant region is necessary in the disk cache 8103, when the data is unnecessary in the host system 8100, or when a certain period of time has elapsed after the data is stored in the disk cache 8103. Meanwhile, when the read-out of the data is necessary, if data is on the cache the CPU 8101 reads out the data from the disk cache 8103, and data is not read out from the information recording medium 8201. If the data which is to be written on an address is on the disk cache, the CPU 8101 writes new data on the disk cache 8103. Therefore, the number of data writing on the information recording medium 8201 is reduced. Thus, the number of inputs/outputs is reduced and the operation for recording/reproducing of data is performed at a high speed.

When the data writing is unnecessary, the CPU 8101 closes the partition (a). In the closing processing, the CPU 8101 issues an instruction of writing all data on the disk cache 8103 into the partition (a) of the information recording medium 8201 and at the same time, the partition (a) is logically cut off.

Thus, the data recording on the partition (a) of the information recording medium 8201 is carried out only from the opening processing of the partition (a) until the closing processing thereof.

Next, the data read-out of the host system 8100 is described below. When the data read-out from the (b) partition of the information recording medium 8201 is necessary, the CPU 8101 opens the (b) partition in read-only mode. The CPU 8101 reads out management information from the (b) partition of the information recording medium 8201 in the opening processing.

Next, the CPU 8101 reads out data from the (b) partition. In the read-out processing of data, the CPU 8101 reads out data from the (b) partition of the information recording medium 8201 in the magnetic disk device 8200 and issues an instruction of storing the data thus read out in the disk cache 8103 and at the same time, this data is transferred to the main memory 8102.

When the read-out of data is unnecessary, the CPU 8101 closes the (b) partition. In this closing processing, the CPU 8101 abandons the data on the disk cache 8103 and cuts off the (b) partition logically.

Thus, the reproduction of the data from the (b) partition is performed only from the opening processing of the (b) partition until the closing processing thereof. Any data is not written into the partition which has been opened in read-only mode.

The partition which has been opened is not opened again without being closed or the partition which has been closed is not closed again without being opened.

Let it be supposed that the (a) partition of the information recording medium 8201 is opened in read/write mode and data to be written into the (a) partition exists on the disk cache 8103. If the power source of the host system 8100 is cut off, the data on the disk cache 8103 is lost and the data to be written is not written into the (a) partition. Therefore, in the (a) partition, an inconsistency occurs in the file system. For example, the inconsistency occurs in the file control information or the difference occurs between the file control information and the actuality of the file.

If the CPU 8101 opens the (a) partition again in read/write mode and writes data thereinto with inconsistency occurring in the file system, a file which already exists may be destroyed. When the CPU 8101 detects the inconsistency of the file management information, the system goes down.

In order to avoid this, the CPU 8101 checks the consistency of the file system generated in each partition of the information recording medium 8201 when the power source is turned on, namely, in boot time. If an inconsistency is detected, the consistency of the file system is corrected. In the file system in which the inconsistency has been corrected thus, an existing file is not destroyed or the system does not go down due to the inconsistency in the file system.

When an optical disk which is a removable information recording medium is used in such a host system, the termination time of input/output in the program and the termination time of an operation for actual recording data into an information recording medium does not coincide with each other. Therefore, an optical disk may be taken out before the partition is closed, namely, before data on the disk cache is recorded. In particular, a plurality of programs simultaneously run in the UNIX. Therefore, there is a high possibility that the optical disk is taken out before all programs write data into the optical disk.

The inconsistency of the file system exists in the optical disk taken out before all data are written into the disk. Since the optical disk is exchangeable, it may be incorporated in the system or replaced after boot. Therefore, when the optical disk is used in the above system, the consistency is not corrected in boot time even when an inconsistency exists in the file system, and the existing file is broken or a system-down occurs due to the inconsistency of the file system.

When the optical disk is replaced before data on the disk cache is recorded, namely, when the optical disk is taken out and then another optical disk is inserted into, data which should have been already written on the optical disk is written into another optical disk replaced.

In the optical disk, since ROM (read-only memory) disk is used or in the write protect condition by the setting of a write protecting button, there is a case in which data cannot be written. When a user performs a data writing operation into the optical disk, the user does not write data on the optical disk. Therefore, inconsistency occurs between the data in the disk cache 8103 and the data on the optical disk, which may cause a system-down.

Since in a 4.3 BSD UNIX system in particular, a magnetic disk device having physical sector size as 512 B (bytes) is assumed to be an external memory, a data access is performed in units of 512 bytes. For example, in a manual of SunOs 4.0 of Sun Microsystem Corp. which is a representative manufacturer of a UNIX work stations, the sector size is 512 B in the item of System & Network Administration.

The optical disk is usually provided with a guide track which can be optically detected so that laser beams are irradiated on a recording layer of the guide track and a change which can be optically detected is made to record information. In a general optical disk to be used for processing information, a track formed on the optical disk is divided into a plurality of sectors of a fixed length so that information is recorded and reproduced on a sector by sector basis. In the process of manufacturing such an optical disk, simultaneously with the formation of a guide track, address information showing the position of a sector on the disk is formed for every constant interval. That is, in the process of manufacturing the optical disk, the size of the sector is physically determined. In ISO two kinds of formats of 512 B and 1024 B are determined as the format of the optical disk having a diameter of 130 mm. In the optical disk, in order to secure reliability, data is recorded with an error correcting code so as to correct an error and reproduce data. Since the error correcting code is formed with one sector being a unit, an error is corrected on a sector by sector basis. Therefore, in the case of an optical disk having a sector size of 1024 B, data cannot be recorded or reproduced with 512 B being a unit.

However, in an optical disk having a sector size as 1024 B, compared with an optical disk having a sector size as 512 B, smaller number of control information such as address suffices on a disk. Therefore, more user data can be recorded. As such, under a system in which UNIX is an OS, there is a demand of using an optical disk having a sector size of 1024 B.

But as described previously, an optical disk in which sector size is 1024 B cannot be used under UNIX which performs a data access on 512 B.

SUMMARY OF THE INVENTION

Accordingly, an essential object of the present invention is to provide a method for recording/reproducing information by safely using an optical disk having a sector size of 1024 bytes and serving as a removable information recording medium under the use of UNIX operating system, and an apparatus for carrying out the method.

In a data reproducing operation, the method according to the present invention calculates the position of a sector corresponding to reproducing data existing on the information recording medium, reads all data of this sector into a converting buffer memory, calculates the position of data existing on the converting buffer memory and requested by a host system, and transfers data from the converting buffer memory to the host system with the position of the data thus calculated in response to the request made by the host system.

In a data recording operation, the method according to the present invention calculates the position of a sector of the information recording medium into which recording data is to be written. If the front of the recording data is not at the front of the sector, the sector is read out to be stored in the front of the converting buffer memory. If the end of the recording data is not at the final position of the sector, the sector is read out to be stored in the end of the converting buffer memory and the recording data is overwritten into the converting buffer memory from a position obtained by adding an offset corresponding to data existing in the range from the front of the sector to the front of the recording data to write the data on the converting buffer memory into the information recording medium.

In accordance with the above-described method, in the data reproducing operation, data read out from the information recording medium is stored in the converting buffer memory and a necessary portion of the data is transferred as reproducing data. In the data recording operation, data is read out from the information recording medium as necessary into the converting buffer memory and the data read out thus is written into the information recording medium with the recording data overwritten on the data read out. Thus, under a UNIX which executes a data access in units of 512 bytes, an optical disk having a sector size of 1024 bytes can be used by the use of the converting buffer memory which makes a conversion of the sector size.

According to the present invention, in order to safely use the optical disk serving as a removable medium, the following processing for controlling the medium is executed under UNIX which writes data according to write-back method.

The apparatus according to the present invention comprises an open table corresponding to the "open" state of each partition of the optical disk. The removal of the optical disk from the optical disk device is prohibited when any of partitions of the open table is in "open" state and permitted when all the partitions are in "closed" state. Thus, the optical disk can be taken out from the optical disk device only in the state where data has been correctly written.

According to the present invention, optical disks having different disk identification information are used to read out disk identification information from each optical disk for detecting a possibility that the optical disk has been replaced. Then, it is decided whether or not the disk identification information thus read out is the same as information read when the partition has been opened. If both are the same, the removal of the optical disk from the optical disk device is prohibited. If both are different from each other, a data input to a replaced optical disk and a data output therefrom are prohibited. Thus, even though the optical disk device in use is reset and the optical disk becomes able to be taken out therefrom, processing continues by prohibiting the take-out of the optical disk again. In addition, even though the optical disk is forcibly replaced during its use, the data of the replaced optical disk is not destroyed.

Further, according to the present invention, the apparatus comprises an open flag, provided on the optical disk, corresponding to the use situation of each partition. The open flag is set to "in use" when the partition is opened in read/write mode and "non-use" when the partition is closed. If the open flag is in the state of "in use" in opening the partition again in read/write mode, the processing for opening the partition is decided as being unsuccessful. Since data is not written into a partition having an inconsistency in the file system due to the take-out of the optical disk during its use, an existing file is not destroyed or the system does not go down.

According to the method of the present invention, the processing for opening the partition is decided as being unsuccessful if it is detected that data writing into the optical disk is impossible. Since processing for writing data into an information recording medium is not erroneously executed, an inconsistency between data on the information recording medium and data on the disk cache does not occur. Thus, the system does not go down.

As described above, according to the present invention, the removable optical disk serving as the information recording medium can be safely used under the UNIX.

BRIEF DESCRIPTION OF THE DRAWINGS

These and other objects and features of the present invention will become clear from the following description taken in conjunction with the preferred embodiments thereof with reference to the accompanying drawings, in which:

FIGS. 2A and 2B are flowcharts showing the flow of processing for converting a sector size in a method for recording/reproducing information according to an embodiment of the present invention;

FIG. 6(a–g) is a content view showing an open table according to an embodiment of the present invention;

FIG. 7(a–g) is a content view showing an open flag table according to an embodiment of the present invention.

DESCRIPTION OF THE PREFERRED EMBODIMENTS

Figure 1:
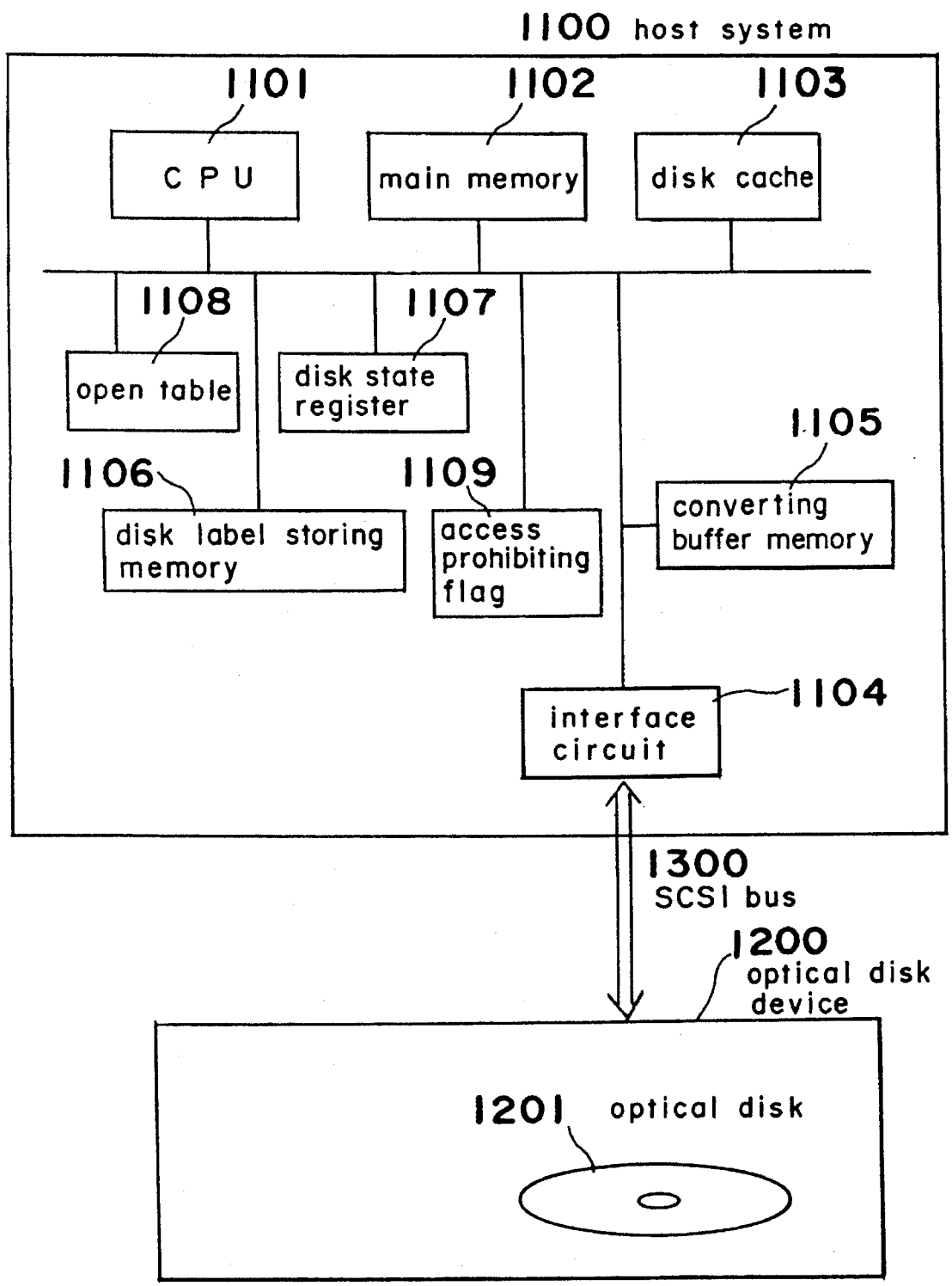
FIG. 1 is a block diagram showing an apparatus for recording/reproducing information according to an embodiment of the present invention.

Before the description of the present invention proceeds, it is to be noted that like parts are designated by like reference numerals throughout the accompanying drawings.

There is shown in FIG. 1 which is a block diagram of an information recording/reproducing apparatus using an optical disk according to an embodiment of the present invention. A host system 1100 and an optical disk device 1200 serving as an external memory are connected with each other via an SCSI bus (Small Computer System Interface) 1300.

The host system 1100 uses UNIX which performs a data access in units of 512 B (bytes) as an operating system. The host system 1100 comprises a CPU 1101, a main memory 1102, a disk cache 1103, an interface circuit 1104, a converting buffer memory 1105, a disk label storing memory 1106, a disk state register 1107, an open table 1108, and an access prohibiting flag 1109.

The main memory 1102 stores a plurality of programs and data. The CPU 1101 reads out data and programs stored in the main memory 1102 into execution. The UNIX has a data access to the main memory 1102 and the disk cache 1103. The disk cache 1103 is a memory for performing an input/output processing between the host system 1100 and an external memory at a high speed. The interface circuit 1104 is a circuit for connecting the host system 1100 to the SCSI bus 1300. The converting buffer memory 1105 is a work memory for converting a data access in units of 512 bytes demanded by the UNIX into units of sector size of 1024 bytes of an optical disk 1201. The disk label storing memory 1106 stores a disk label read out from the optical disk 1201. The disk label is described later. The disk state register 1107 is a register for storing the medium type of the optical disk 1201 and a write inhibition state of data set by means of a write protecting button. The open table 1108 holds the open state of each partition of the optical disk 1201. Each partition takes a value of "open" or "close". The access prohibiting flag 1109 keeping the prohibition state of a data input to the optical disk 1201 and a data output therefrom, thus taking a value of either "access prohibition" or "access permission".

The optical disk device 1200 accommodates the optical disk 1201 serving as an information recording medium. The optical disk device 1200 is provided with an SCSI serving as an interface, thus recording data into the optical disk 1201 and reproducing data therefrom, reporting the type of the optical disk 1201 and the protection state, prohibiting and permitting the removal of the optical disk 1201 from the optical disk device 1200 by means of an SCSI command. In addition, the optical disk device 1200 reports the Unit Attention state to the host system 1100 when the optical device is reset by the turn-on of the power source and the optical disk is inserted thereinto. The optical disk 1201 is accommodated in a cartridge (not shown) and a user can prohibit the writing of data to the optical disk by means of a write protection button (not shown) provided on the cartridge. The optical disk 1201 is logically divided into a plurality (three) of partitions, namely, an (a) partition, a (b) partition, and a (c) partition. A file system is constructed in each partition. The sector size of the optical disk 1201 is 1024 bytes.

The present invention using the optical disk having a sector of 1024 bytes under the UNIX in which a data access is executed in units of 512 bytes is described below with reference to FIGS. 2 and 3.

FIGS. 2A and 2B are flowcharts showing the flow of processing for converting a sector size in the method for recording/reproducing information according to this embodiment.

Figure 3B:
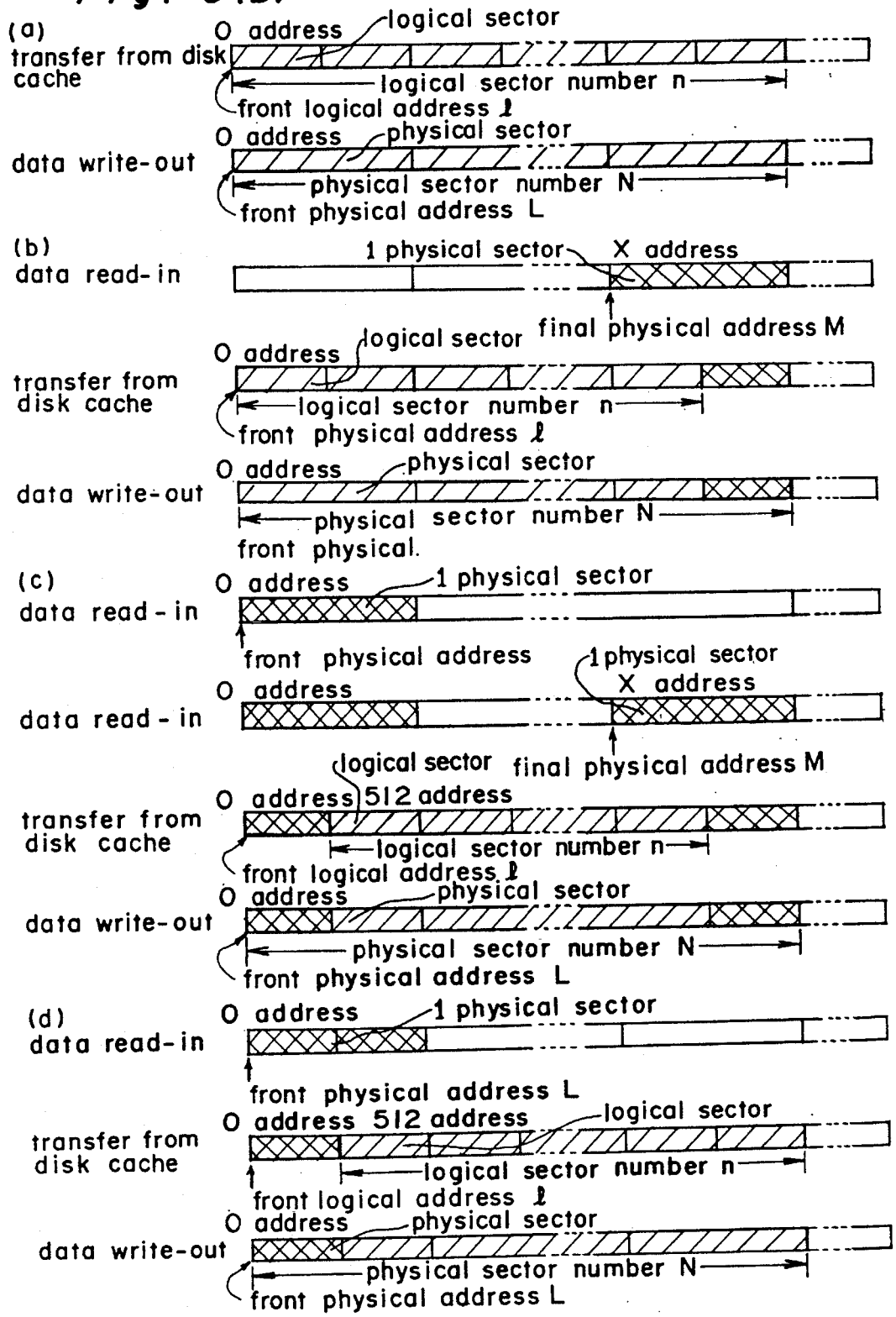
FIGS. 3A(a–d) and 3B(a–d) are content views of a converting buffer memory according to an embodiment of the present invention.

FIGS. 3A and 3B are content views of the converting buffer memory 1105 for describing the embodiment. FIG. 3A shows the content of the converting buffer memory 1105 in a data read-out. FIG. 3B shows the content of the converting buffer memory 1105 in a data writing.

A sector in the information recording medium, the sector size of which is 512 bytes is called a logical sector; the address of the sector is called a logical address; the address of the front sector of data is called a front logical address; the address of the last sector of the data is called a final logical address; and the number of sectors in which data exist is called the number of logical sectors. The sector in information recording medium, the sector size of which is 1024 bytes is called a physical sector; the address of the sector is called a physical address; the address of the front sector of data is called a front physical address; the address of the last sector of the data is called a final physical address; and the number of sectors in which data exist is called the number of physical sectors.

In this embodiment, the addresses of all sectors and the address of the buffer memory are integers starting from "0", and the number of logical sectors and the number of physical sectors are integers of "1" or more. The converting buffer memory 1105 has a sufficient memory capacity for storing data to be recorded and reproduced.

The processing to be executed by the CPU 1101 in the case where the host system 1100 reads data from the optical disk 1201 accommodated in the optical disk device 1200 to the disk cache 1103 is described below with reference to FIGS. 1 and 2A.

Let it be supposed that the read-out of the data of the front logical address (l) and the logical sector number (n) becomes necessary when the host system 1100 is reading out the program from the main memory 1102 into execution. In the UNIX which performs a data access in units of 512 bytes, the data address in the information recording medium is designated by front logical address (l), and the number of blocks in the information recording medium is designated by the logical sector number (n).

The CPU 1101 executes the following processing as shown in FIG. 2A below in reading out the data of the logical sector number (n) from the front address (l).

(1) Calculation of front physical address (L) from front logical address (l):

If the front logical address (l) is an even number, $$L=l/2$$

If the front logical address (l) is an odd number, $$L=(l-1)/2$$

(2) Calculation of physical sector number (N) from logical sector number (n):

If the front logical address (l) is an even number and the logical sector number (n) is an even number, $$N=n/2$$

If the front logical address (l) is an even number and the logical sector number (n) is an odd number, $$N=(n+1)/2$$

If the front logical address (l) is an odd number and the logical sector number (n) is an even number, $$N=(n/2)+1$$

If the front logical address (l) is an odd number and the logical sector number (n) is an odd number, $$N=(n+1)/2$$

(3) Read-out of data from optical disk 1201 to converting buffer memory 1105:

The CPU 1101 drives the interface circuit 1104 to output an instruction of reading out the data of the physical sector number (N) from the front physical address (L) to the optical disk device 1200, reads the data having a capacity corresponding to the physical sector of a physical sector number (N) from the front address (L) of the optical disk 1201, and stores this data in the converting buffer memory 1105 from "0" address which is the front address thereof.

(4) Transfer of data of converting buffer memory 1105 to disk cache 1103:

If the front logical address (l) is an even number, the CPU 1101 transfers data having a capacity corresponding to the logical sectors of the logical sector number (n) from the front address of the converting buffer memory 1105 to the disk cache 1103.

If the front logical address is an odd number, the CPU 1101 transfers data having a capacity corresponding to the logical sectors of the logical sector number (n) from "512" address of the converting buffer memory 1105 to the disk cache 1103. "512" address is an address obtained by adding an offset corresponding to the capacity of one logical sector to the front address.

Then, the CPU 1101 transfers the data of the disk cache 1103 to the main memory 1102.

The content of data to be stored in the converting buffer memory 1105 in the data read-out from the optical disk 1201 is described below.

If the front logical address (l) and the logical sector number (n) are both even numbers, data is stored in the converting buffer memory 1105 as shown in FIG. 3A (a).

Data having a capacity corresponding to the physical sectors of the physical sector number (N) read from the front physical address (L) of the optical disk 1201 is stored in the converting buffer memory 1105 from "0" address thereof. All data stored thus are transferred from "0" address of the converting buffer memory 1105 to the disk cache 1103 as the data of the front logical address (l) and the logical sector number (n).

If the front logical address (l) is an even number and the logical sector number (n) are an odd number, data is stored in the converting buffer memory 1105 as shown in FIG. 3A (b).

Data having a capacity corresponding to the physical sector of the physical sector number (N) read from the front physical address (L) of the optical disk 1201 is stored in the converting buffer memory 1105 from the front "0" address thereof. Of the data stored thus, only data having a capacity corresponding to the logical sectors of the logical sector number (n) is transferred from "0" address of the converting buffer memory 1105 to the disk cache 1103 as the data of the front logical address (l) and the logical sector number (n).

If the front logical address (l) is an odd number and the logical sector number (n) is an even number, data is stored in the converting buffer memory 1105 as shown in FIG. 3A (c).

Data having a capacity corresponding to the physical sectors of the physical sector number (N) read from the front physical address (L) of the optical disk 1201 is stored in the converting buffer memory 1105 from the front "0" address thereof. Of data stored thus, data having a capacity corresponding to the logical sectors of the logical sector number (n) is transferred from "512" address of the converting buffer memory 1105 to the disk cache 1103 as the data of the front logical address (l) and the logical sector number (n). "512" address is obtained by adding an offset corresponding to a capacity of one logical sector to "0" address.

If the front logical address (l) and the logical sector number (n) are both odd numbers, data is stored in the converting buffer memory 1105 as shown in FIG. 3A (d).

Data having a capacity corresponding to the physical sectors of the physical sector number (N) read from the front physical address (L) of the optical disk 1201 is stored in the converting buffer memory 1105 from "0" address thereof. Of stored data, data having a capacity corresponding to the logical sectors of the logical sector number (n) are transferred from "512" address to the disk cache 1103 as the data of the front logical address (l) and the logical sector number (n). "512" address is obtained by adding an offset corresponding to a capacity of one logical sector to "0" address.

As described above, according to the present invention, a request for reading out data is converted, the data is read out from the optical disk 1201 to the converting buffer memory, and only a necessary portion of read-out data is transferred to the disk cache 1103. Thus, the optical disk 1201, the sector size of which is 1024 bytes can be used in the operating system in which data is read out in units of 512 bytes.

Next, the processing to be executed by the CPU 1101 when the host system 1100 writes the data of the disk cache 1103 into the optical disk 1201 is described with reference to FIGS. 1 and 2B. The embodiment to be described below is applied to the case in which the optical disk 1201 is an information recording medium in which data can be overwritten.

Let it be supposed that the writing of the data of the front logical address (l) and the logical sector number (n) becomes necessary when the host system 1100 is reading out the program from the main memory 1102 into execution.

First, the CPU 1101 transfers the data to be written into the main memory 1102 to the disk cache 1103. In the UNIX which executes a data access in units of 512 bytes, the data address to be written into the information recording medium is designated by front logical address (l) and the number of blocks in the information recording medium is designated by the logical sector number (n).

In writing data, the CPU 1101 executes the following processing as shown in FIG. 2B.

(1) Calculation of front physical address (L) from front logical address (l):
If the front logical address (l) is an even number, $L=l/2$ If the front logical address (l) is an odd number, $L=(l-1)/2$ (2) Data read-out of front physical address (L) from optical disk 1201 when front logical address (l) is an odd number:
The CPU 1101 drives the interface circuit 1104 and outputs an instruction of reading out data of one sector from the front physical address (L) to the optical disk device 1200, reads the data of one physical sector from the front physical address (L) of the optical disk 1201, and stores this data in the converting buffer memory 1105 from "0" address thereof.

(3) Calculation of physical sector number (N) from logical sector number (n):
If the front logical address (l) and the logical sector number (n) are both even numbers;

$N=n/2$

If the front logical address (l) is an even number and the logical sector number (n) is an odd number;

$N=(n+1)/2$

If the front logical address (l) is an odd number and the logical sector number (n) is an even number;

$N=(n/2)+1$

If the front logical address (l) and the logical sector number (n) are both odd numbers;

$N=(n+1)/2$ (4) Calculation of final logical address (m) and final physical address (M):
The final logical address (m) is calculated as follows from the front logical address (l) and logical sector number (n):

$m=l+n-1$

If the final logical address (m) is an even number, the final physical address (M) is:

$M=m/2$ (5) Read-out of sectors of final physical address (M) from optical disk 1201 to sector when final logical address (m) is an even number:
If the final logical address (m) is an even number, first, an address (X) of the converting buffer memory 1105 in which the final physical sector is to be stored is calculated as follows based on the physical sector number (N):

$X=1024\times(N-1)$

Next, an instruction of reading out the data of one sector from the final physical address (M) is outputted to the optical disk device 1200, data of one physical sector is read from the final physical address (M) of the optical disk 1201, and this data is stored in the converting buffer memory 1105 from the address (X) in which the final logical sector is to be stored.

(6) Overwriting of data of disk cache 1103:
The CPU overwrites the date to be written from the disk cache 1103 into the converting buffer memory 1105. If data exists on the converting buffer memory 1105 at this time, data is overwritten.

If the front logical address (l) is an even number, data having a capacity corresponding to the logical sector of the logical sector number (n) is written in the converting buffer memory 1105 from the front address thereof.

If the front logical address (l) is an odd number, data having a capacity corresponding to the logical sector of the logical sector number (n) is written in the converting buffer memory 1105 from "512" address thereof. "512" address is obtained by adding an offset corresponding to a capacity of one logical sector to "0" address.

(7) writing of data of converting buffer memory 1105 into optical disk 1201:
The CPU 1101 drives the interface circuit 1104 to output an instruction of writing data of the physical sector number (N) from the front physical address (L) to the optical disk device 1200 and transfers the data having a capacity corresponding to the physical sectors of the physical sector number (N) from "0" address of the converting buffer memory 1105 to the optical disk device 1200. In the optical disk device 1200, this data is written into the optical disk 1201 in the order from the front physical address (L) thereof.

The content of data to be stored in the converting buffer memory 1105 in reading out data from the optical disk 1201 is described below.

If the front logical address (l) and the logical sector number (n) are both even numbers, data is stored in the converting buffer memory 1105 as shown in FIG. 3B (a).

Data of the front logical address (l) and the logical sector number (n) transferred from the disk cache 1103 is stored in the converting buffer memory 1105 in the order from "0" address thereof. Data having a capacity corresponding to the physical sector of the physical sector number (N) is written into the optical disk 1201 in the order from the front physical address (L).

If the front logical address (l) is an even number and the logical sector number (n) is an odd number, data is stored in the converting buffer memory 1105 as shown in FIG. 3B (b).

Since the final logical address (m) is an even number, data of the physical sector of the final physical address (M) of the optical disk 1201 is read into the converting buffer memory 1105 in the order from the (X) address thereof. Then, data of the front logical address (l) and the logical sector number (n) transferred from the disk cache 1103 is stored in the converting buffer memory 1105 from "0" address thereof. At this time, the front half of 512 bytes of the data of the final physical address (M) already read is overwritten. Stored data corresponding to the physical sector number (N) is written into the optical disk 1201 from the front physical address (L) thereof.

If the front logical address (l) is an odd number and the logical sector number (n) is an even number, data is stored in the converting buffer memory 1105 as shown in FIG. 3B (c).

The data of the physical sector of the front physical address (L) of the optical disk 1201 is read into the converting buffer memory 1105 from "0" address thereof. Since the final logical address (m) is an even number, the data of the physical sector of the final physical address (M) of the optical disk 1201 is read into the converting buffer memory 1105 in the order from (X) address thereof. Thereafter, the front logical address (l) and the data of the logical sector number (n) transferred from the converting buffer memory 1105 are stored in "512" address thereof. At this time, the 512 bytes of the second half of the data of the front physical address (L) and 512 bytes of the first half of the data of the final physical address (M) already read are overwritten. All stored data of a capacity corresponding to the physical sector number (N) are written into the optical disk 1201 in the order from the front physical address (L).

If the front logical address (l) and the logical sector number (n) are both odd numbers, data is stored in the converting buffer memory 1105 as shown in FIG. 3B (d).

The data of the physical sector of the front physical address (L) of the optical disk 1201 is read into the converting buffer memory 1105 from "0" address thereof. In addition, the front logical address (l) and the data of the logical sector number (n) transferred from the disk cache 1103 are stored in the converting buffer memory 1105 in the order from "512" address thereof. At this time, 512 bytes of the second half of the data of the front physical address already read (L) are overwritten. All stored data of a capacity corresponding to the physical sector number (N) are written into the optical disk 1201 in the order from the front physical address (L).

As described above, according to the present invention, a request for data writing is converted, data is read from the optical disk 1201 into the converting buffer memory 1105 as necessary, data transferred from the disk cache 1103 is overwritten on data written into the converting buffer memory 1105, and the data on the converting buffer memory 1105 is written into the optical disk 1201. Thus, it is possible to use the optical disk 1201 having a sector size of 1024 bytes under an operating system in which data is written in units of 512 bytes.

According to the embodiment, the optical disk having the sector size of 1024 bytes can be used without damaging its capacity under the UNIX making a data access in units of 512 bytes.

The above description is concerned with the recording and reproduction of information with respect to an optical disk, but the present invention can be applied to an information recording medium other than the optical disk having a unit of recording and reproducing fixed data.

The present invention for safely using the optical disk which is a removable information recording medium under the UNIX which writes data in write-back method is described with reference to FIGS. 4, 5, 6, and 7.

Figure 4:
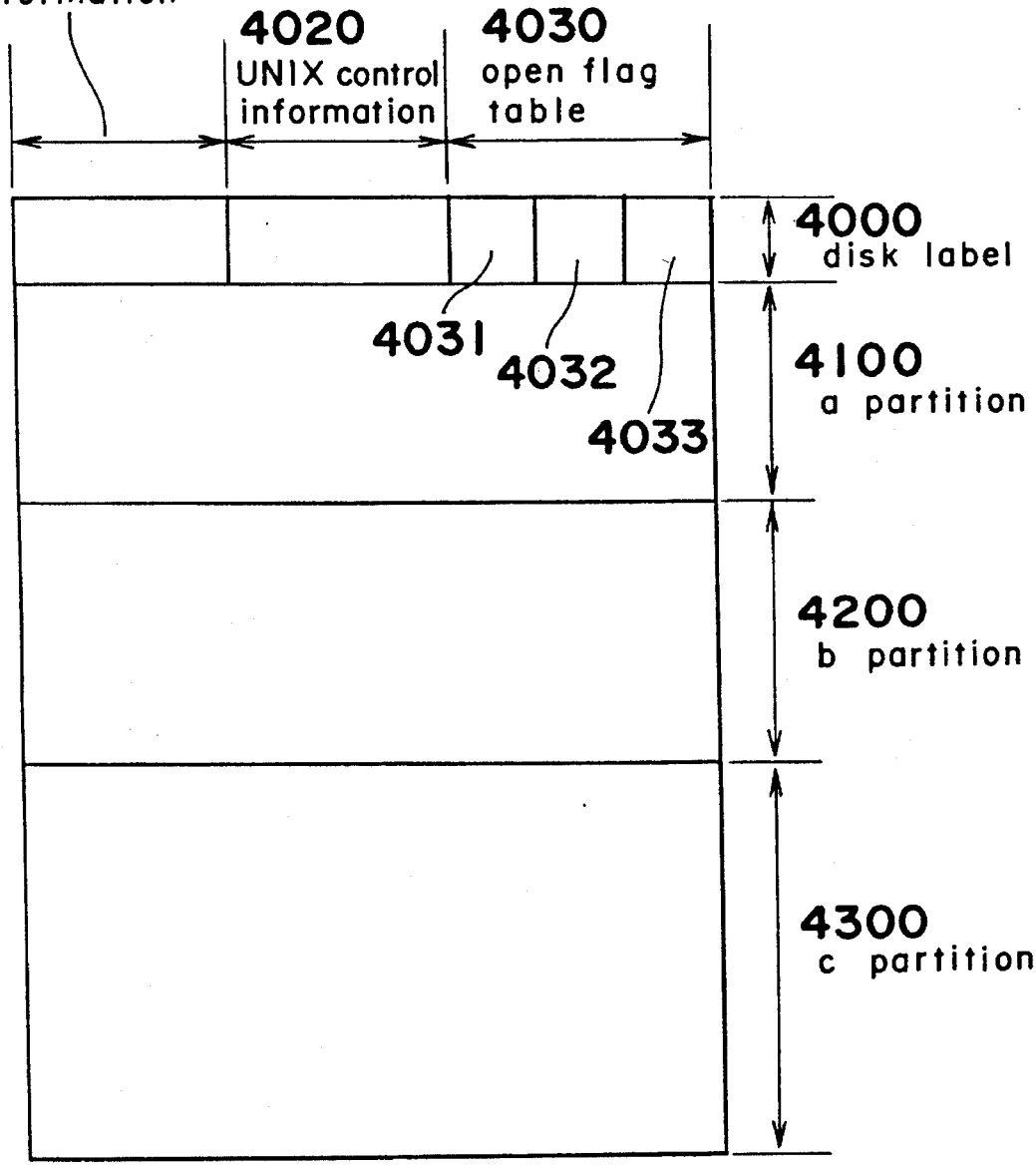
FIG. 4 is a region view on an optical disk according to an embodiment of the present invention.

FIG. 4 shows respective regions of the optical disk 1201 according to an embodiment of the present invention. The optical disk 1201 is divided into a disk label 4000, an (a) partition 4100, a (b) partition 4200, and a (c) partition 4300. The disk label 4000 comprises a disk identification information 4010, a UNIX control information 4020, and an open flag table 4030. The disk identification information 4010 is information for discriminating one optical disk from the other. When the construction of the UNIX is formed on an optical disk, a user allots a different value to the disk identification information 4010 for each optical disk. The UNIX control information 4020 includes information necessary for the UNIX to manage the optical disk 1201 such as information showing the position and size of each partition, a bit map showing the use state of each partition and the like. The open flag table 4030 comprises open flags 4031, 4032, and 4033 of each partition (a), (b), and (c). Each open flag takes a value either "in use" or "non-use".

FIGS. 5A, 5B, 5C, and 5D are flowcharts showing the flow of processing in controlling a removable medium according to the method for recording/reproducing information of the present invention.

Figure 5A:
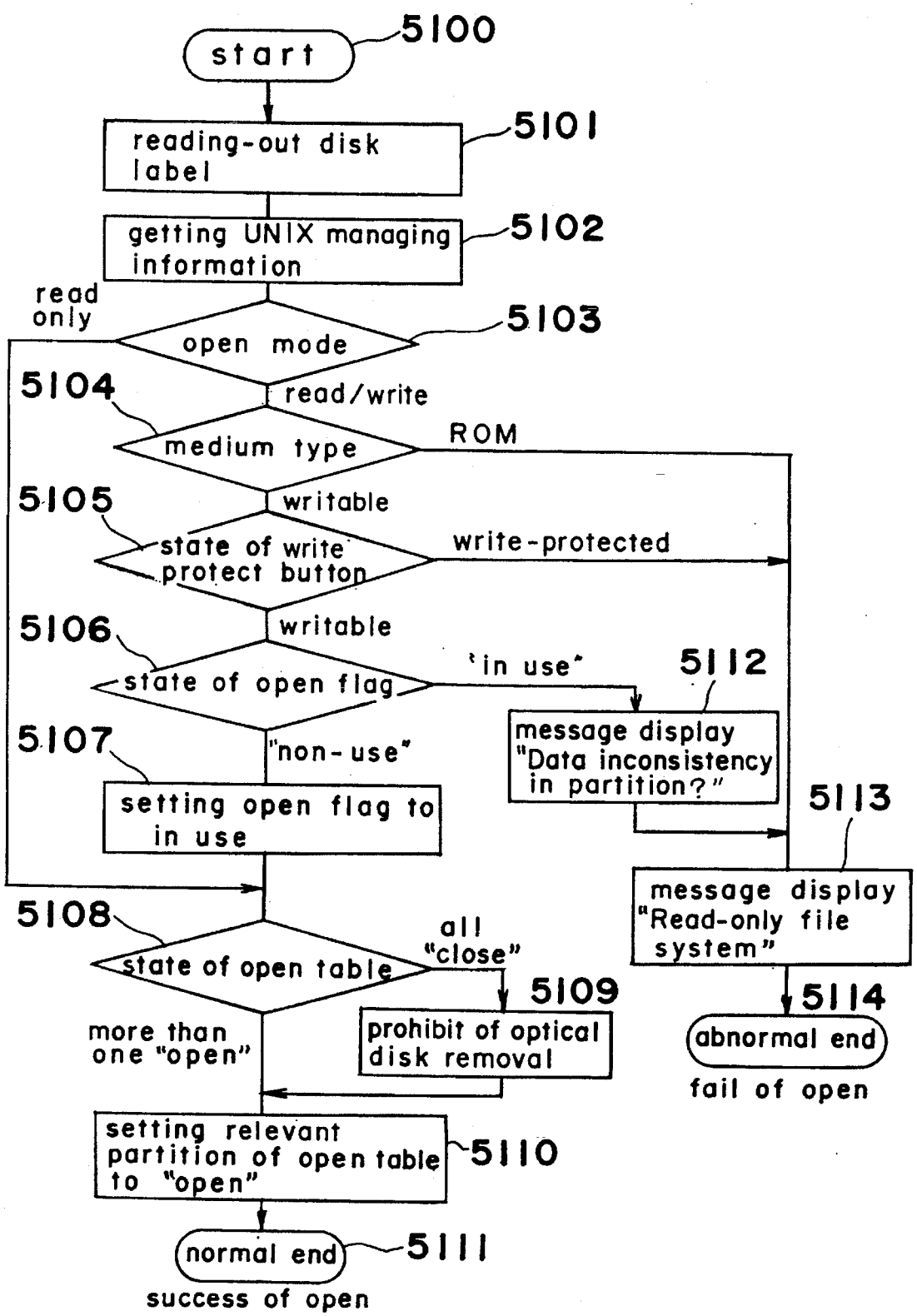
FIGS. 5A–5D are flowcharts showing the flow of processing for controlling a removable medium in the method for recording/reproducing information according to an embodiment of the present invention.

FIG. 5A shows the flow of a control to be made when a partition is opening.

At step 5100, the CPU 1101 starts open processing according to the necessity of a data input to a partition and a data output therefrom. At step 5101, the CPU 1101 reads out the disk label 4000 from the optical disk 1201 and stores it in the disk label storing memory 1106. Then, at step 5102, the CPU 1101 obtains the UNIX control information 4020 from the disk label 4000. At step 5103, the CPU 1101 decides the mode of "open" of the relevant partition.

If it is decided that the mode of "open" is read-only, the CPU 1101 decides as to the condition of each partition of the open table 1108 at step 5108. The CPU 1101 prohibits the removal of the optical disk 1201 from the optical disk device 1200 only when all the partitions of the open table 1108 is "close" state at step 5109 and sets the state of the relevant partition of the open table 1108 to "open" at step 5110, and the CPU 1101 terminates the processing at step 5111 normally, i.e., "open" has succeeded.

If it is decided at step 5103 that "open" is in read/write mode, the CPU 1101 decides as to the type of the medium of the optical disk 1201 at step 5104. If the optical disk 1201 is an ROM medium, the CPU 1101 outputs an error message "Read-only file system" at step 5113, and at step 5114, the CPU 1101 terminates the processing as abnormal, i.e., "open" is unsuccessful.

If it is decided at step 5104 that the optical disk 1201 is a medium into which data can be written, the CPU 1101 decides as to the set state of the write protecting button at step 5105. If the write protecting button is set on the write inhibition side, the CPU CPU 1101 outputs an error message "Read-only file system" at step 5113, thus terminating the processing as abnormal at step 5114, i.e., "open" is unsuccessful.

If the write protecting button is set on the write permission side, the CPU 1101 decides as to the state of the open flag of the relevant partition at step 5106. If the open flag of the relevant partition takes a value "in use", the CPU 1101 outputs an error message "Data inconsistency in partition ? (? means a relevant partition)" at step 5112, and outputs another error message "Read-only file system" at step 5113, thus terminating the processing as abnormal at step 5114, i.e., "open" is unsuccessful.

If it is decided at step 5106 that the open flag takes a value "non-use", the CPU 1101 sets the open flag of the relevant partition of the optical disk 1201 to "in use" at step 5107. Then, the CPU 1101 decides as to the state of each partition of the open table 1108 at step 5108. If each partition of the open table 1108 is in "close" state, the CPU 1101 inhibits the removal of the optical disk 1201 from the optical disk device 1200 at step 5109 and sets the state of the relevant partition of the open table 1108 to "open" at step 5110, thus terminating the processing as normal at step 5111, i.e., "open" is successful.

Figure 5B:
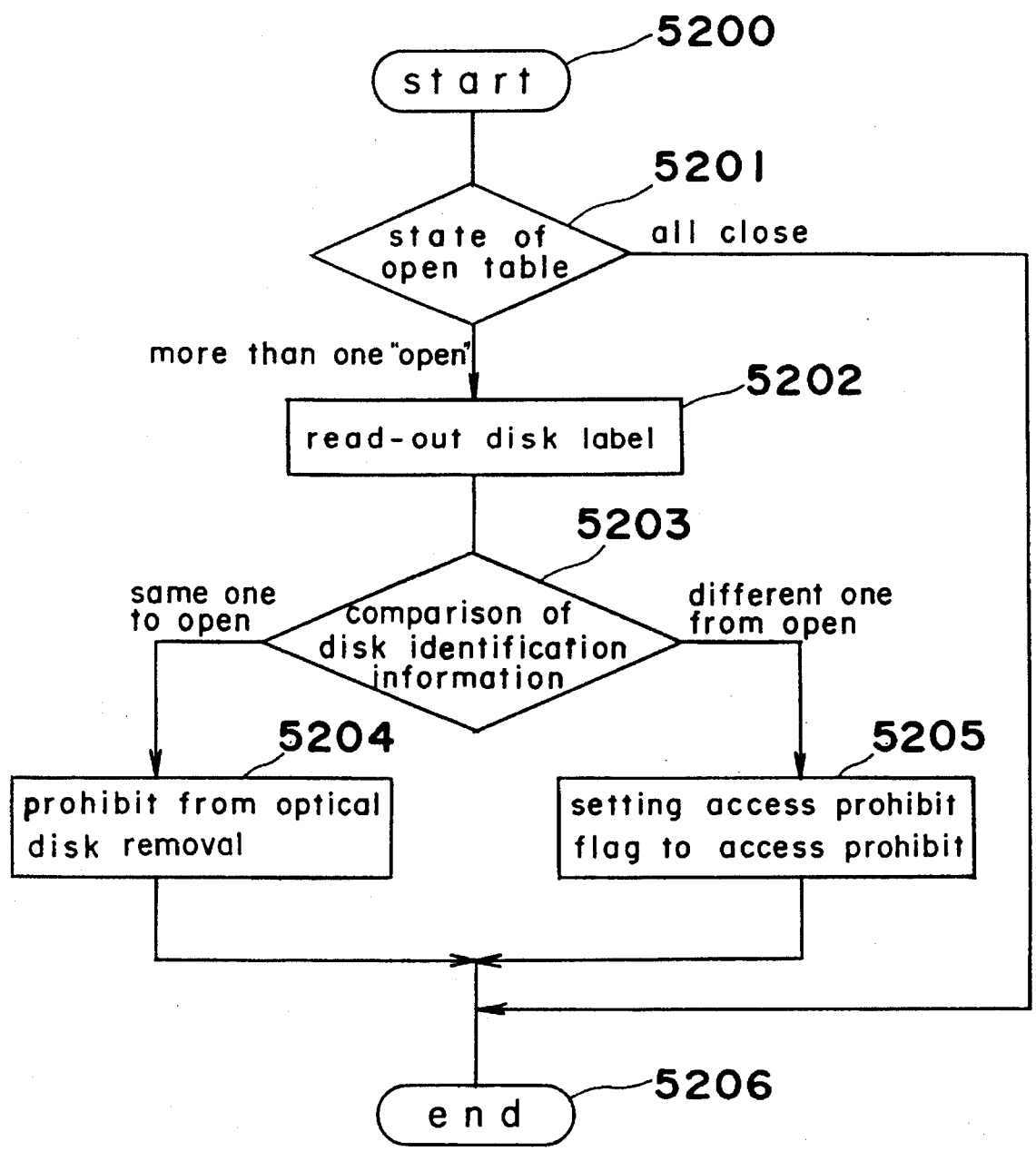

FIG. 5B shows the flow of the control when the CPU 1101 has detected that there is a possibility of replacing the optical disk 1201.

When the CPU 1101 has detected that there is a possibility of replacing the optical disk 1201 due to the turn-on of the power supply and so on, it starts control processing of replacing the disk at step 5200. The CPU 1101 decides as to the state of the open table 1108. If the state of all partitions of the open table 1108 is "close", the CPU 1101 terminates the processing at step 5206.

If the state of any one of the partitions of the open table 1108 is "open", the CPU 1101 reads out the disk label 4000 from the optical disk 1201 at step 5202. Then, the CPU 1101 compares with each other the disk identification information 4010 of the disk label 4000 thus read out and the disk identification information of the disk label already stored in the disk label storing memory 1106 at step 5203. If it is decided that the former is the same as the latter, the CPU 1101 issues an instruction of inhibiting the removal of the optical disk 1201 from the optical disk device 1200. If it is decided that the former is not the latter, the CPU 1101 sets the access prohibiting flag 1109 to "access prohibition" at step 5205. Then, the CPU 1101 does not communicate with the optical disk 1201 until the access prohibiting flag 1109 is released. Thus, the CPU 1101 terminates the processing for controlling the replacement of the disk at step 5206.

Figure 5C:
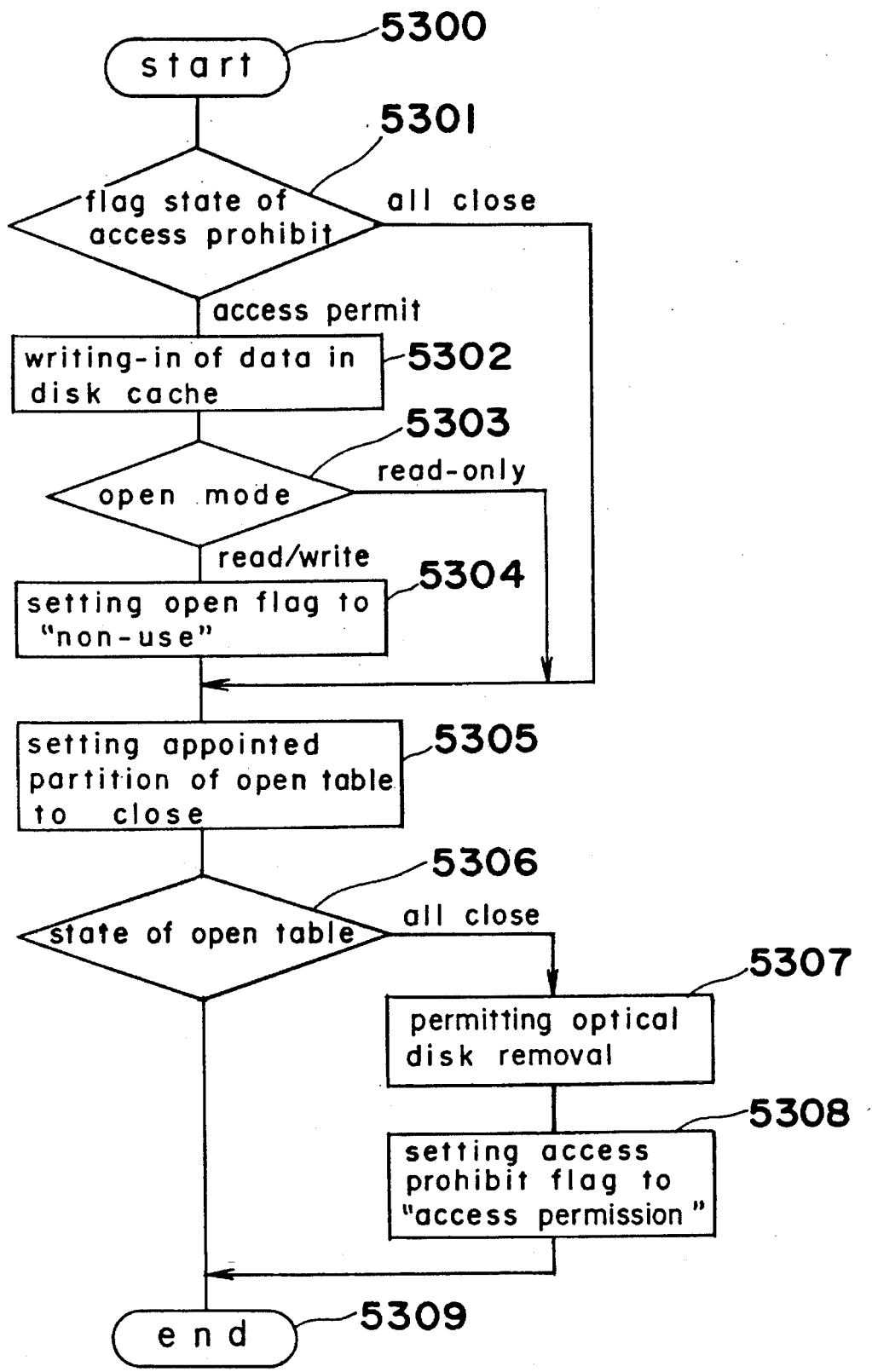

FIG. 5C shows the flow of the control to be made when the partition is "closing".

The CPU 1101 starts close processing at step 5300 when a data input to the relevant partition and a data output therefrom become unnecessary. First, the CPU 1101 decides as to the state of the access prohibiting flag 1109 at step 5301. When the access prohibiting flag 1109 is set to "access prohibition", the CPU 1101 sets the state of the relevant partition of the open table 1108 to "close" at step 5305. Then, at step 5306, the CPU 1101 decides as to the state of each partition of the open table 1108. If it is decided that the state of each partition of the open table 1108 is "close", the CPU 1101 permits the removal of the optical disk 1201 from the optical disk device 1200 at step 5307. Then, at step 5308, the CPU 1101 sets the state of the access prohibiting flag 1109 to "access permission". At step 5308, the CPU 1101 sets the state of the access prohibiting flag 1109 to "access permission". If the access prohibiting flag 1109 is already in the state of "access permission", the processing executed at step 5308 has no particular meaning. Thus, the CPU 1101 terminates the close processing at step 5309.

If it is decided at step 5301 that the access prohibiting flag 1109 is set to "access permission", the CPU 1101 writes data into the optical disk 1201 at step 5302 if this data to be written into the relevant partition is on the disk cache 1103. If the relevant partition is opened in read-only mode, there is no data to be written to the optical disk 1201. Therefore, this processing is skipped. At step 5303, the CPU 1101 decides as to the mode of "open". Only when the relevant partition is opened in read/write mode, the CPU 1101 sets the open flag of the relevant partition of the disk label to the state of "non-use" and writes data into the disk label 4000 of the optical disk 1201 at step 5304.

Then, the CPU 1101 sets the state of the relevant partition of the open table 1108 to "close" at step 5305. The CPU 1101 then decides as to the state of each partition of the open table 1108 at step 5306. If only all the partitions of the open table 1108 are in the state of "close", the CPU 1101 permits the removal of the optical disk 1201 from the optical disk device 1200 at step 5307, and sets the state of the access prohibiting flag 1109 to "access permission" at step 5308. Then, the CPU 1101 terminates the close processing at step 5309.

Figure 5D:
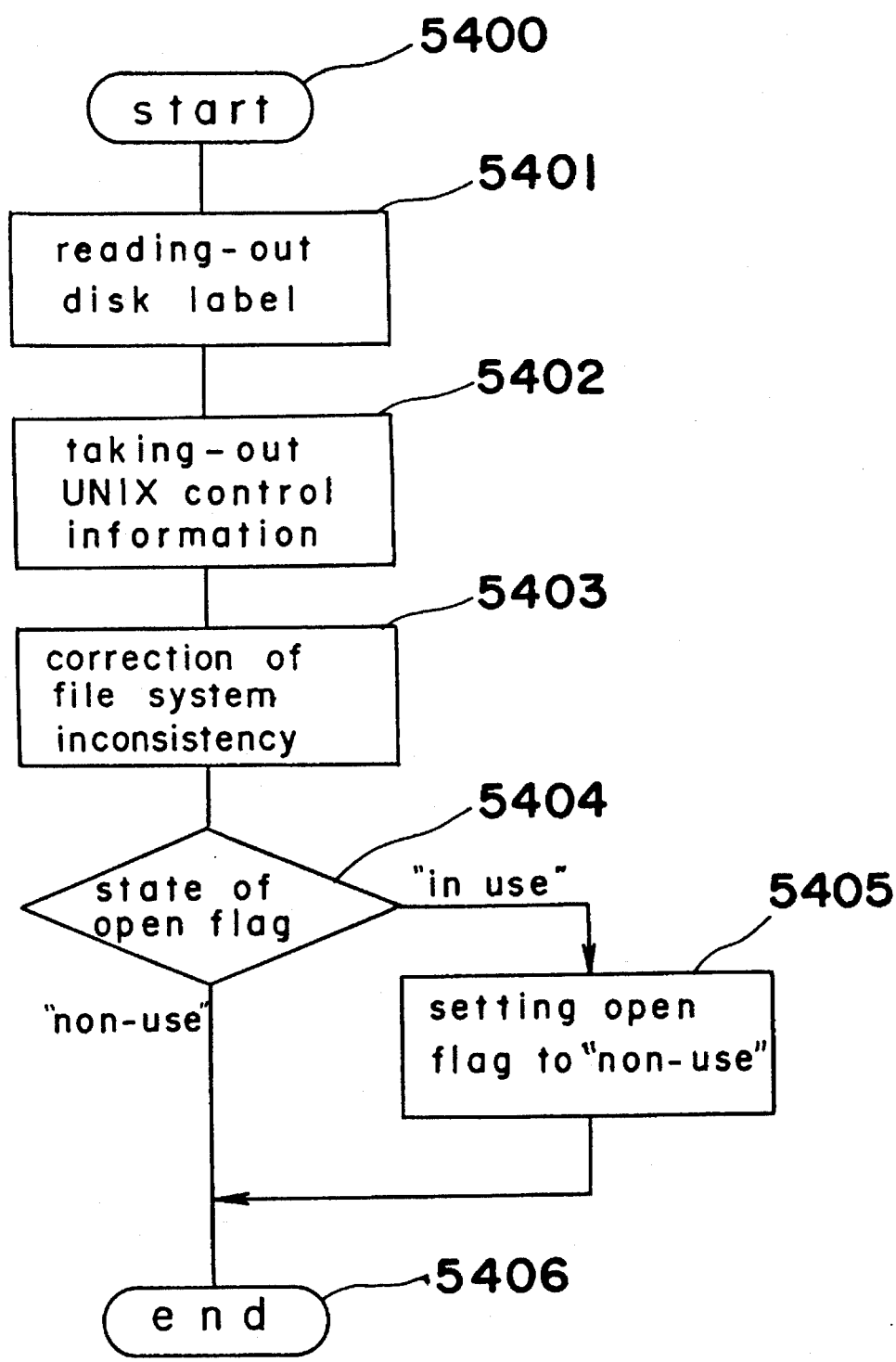
Figure 8:
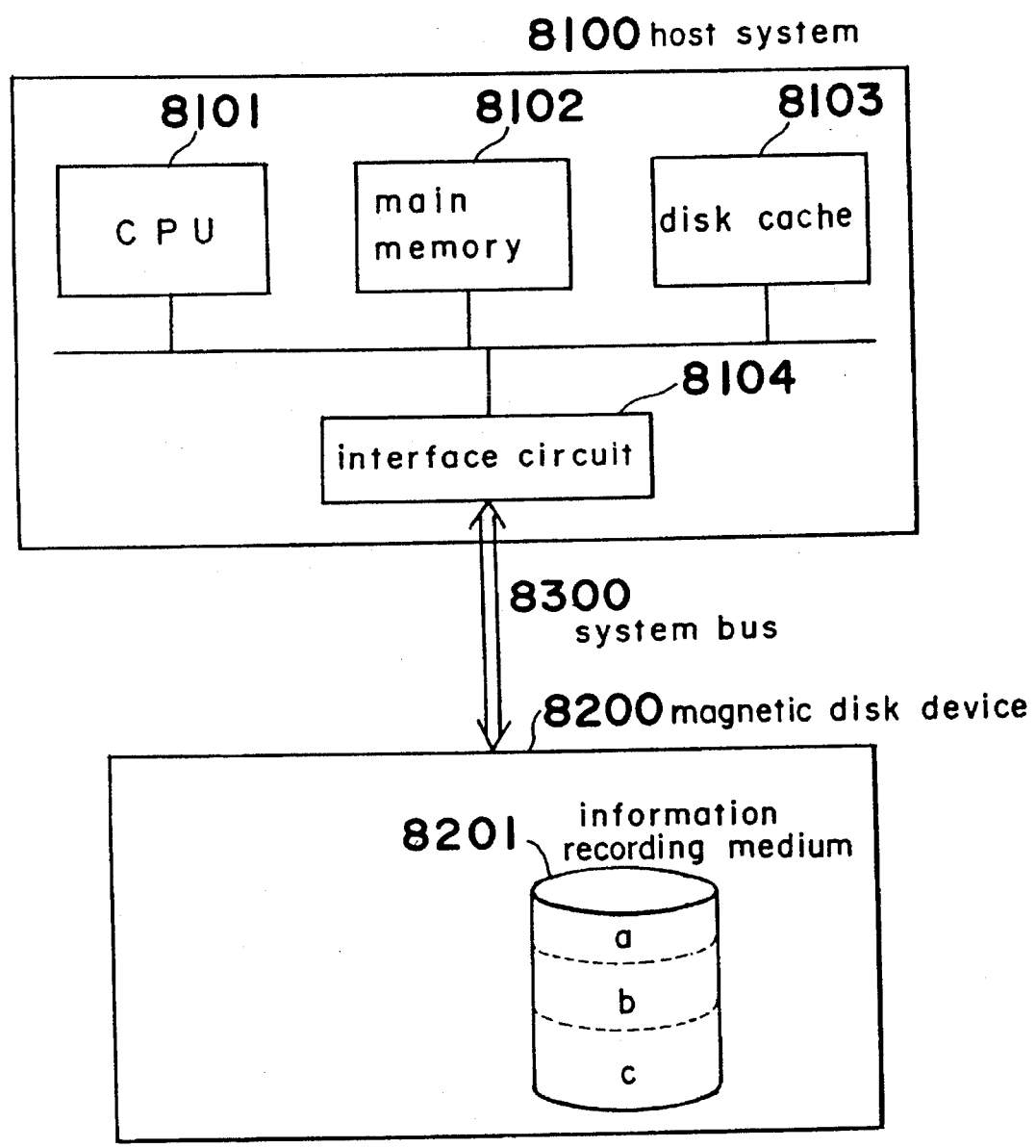
FIG. 8 is a block diagram showing a conventional apparatus for recording/reproducing information.

FIG. 5D shows the flow of the control over the partition in correcting the inconsistency of the file system.

On receipt of an instruction from a user, the CPU 1101 starts the processing for correcting the inconsistency of the file system at step 5400. The CPU 1101 reads out the disk label 4000 from the optical disk 1201, stores it in the main memory 1102 at step 5401, and obtains the UNIX control information 4020 from the disk label 4000 at step 5402.

Then, the CPU 1101 reads out the control information of the file system from the relevant partition of the optical disk 1201 to investigate if there is inconsistency. If there is inconsistency, the CPU 1101 corrects the inconsistency. At step 5404, the CPU 1101 decides as to the state of the open flag of the relevant partition of the disk label 4000 stored in the main memory 1102. If it is decided that the open flag is set to "in use", the CPU 1101 sets the open flag of the relevant partition of the disk label 4000 stored in the main memory 1102 to "non-use" and writes it into the optical disk 1201 at step 5405, thus terminating the processing at step 5406. If it is decided that the open flag is set to "non-use", the CPU 1101 terminates the processing at step 5406.

An embodiment is described below more specifically by way of examples of operation. FIG. 6 shows the content of the open table 1108 according to an embodiment of the present invention. FIG. 7 shows the content of the open flag table 4030 according to an embodiment of the present invention. The conversion processing of sector size previously described is always executed in the input/output of data. But the description of the conversion processing of sector size is omitted.

Description is made below by way of an example in which the optical disk 1201 is a writable information recording medium and the write protecting button is set on the writable side.

First, in the host system 1100, none of the partitions are used. As shown in FIG. 6 (*a*), the states of all the partitions of the open table 1108 are "close". As shown in FIG. 7 (*a*), all the partitions of the open flag table 4030 are "non-use". The access prohibiting flag 1109 is set to the state of "access permission".

First, the partition to be used is opened.

Let it be supposed that the writing of data into the (a) partition 4100 of the optical disk 1201 is necessary when the CPU 1101 is reading out the program from the main memory 1102 into execution. The CPU 1101 starts the open processing in the read/write mode of the (a) partition at step 5100. The CPU 1101 reads out the disk label 4000 from the optical disk 1201, stores it in the disk label storing memory 1106 at step 5101, and obtains the UNIX control information 4020 from the disk label 4000.

Since the partition is opened at step 5103 in the read/write mode, the CPU 1101 decides as to the type of the medium of the optical disk 1201 at step 5104. The CPU 1101 issues a Mode Sense command of SCSI to the optical disk device 1200 via the interface circuit 1104. In response to the command, the optical disk device 1200 produces data including the set state of the write protecting button of the optical disk 1201 and the type of the medium of the optical disk 1201, thus transferring the data to the host system 1100. The CPU 1101 stores this data in the disk state register 1107 and takes out the type of the medium from this data.

Since the optical disk 1201 is a writable medium, the CPU 1101 decides as to the set state of the write protecting button at step 5105. The 1101 takes out the set state of the write protecting button from the disk state register 1107.

Since the write protecting button is set on the writable side, the CPU 1101 decides as to the state of the open flag 4031 of the (a) partition at step 5106. The CPU 1101 takes out the open flag 4031 of the (a) partition from the disk label storing memory 1106 storing the disk label 4000.

The open flag table 4030 is as shown in FIG. 7(a) and the open flag 4031 of the (a) partition is set to "non-use", so that the CPU 1101 sets the open flag 4031 of the (a) partition on the optical disk 1201 to "in use" at step 5107. The CPU 1011 sets the open flag 4031 of the (a) partition of the disk label 4000 stored in the disk label storing memory 1106 to "in use" and writes it into the optical disk 1201 as recording data. At this time, the open flag table 4030 of the optical disk 1201 is as shown in FIG. 7(b).

Then, the CPU 1101 decides as to the state of each partition of the open table 1108 at step 5108. Since the states of all the partitions are in the state of "close" as shown in FIG. 6(a), the CPU 1101 prohibits the removal of the optical disk 1201 from the optical disk device 1200 at step 5109. More specifically, the CPU 1101 issues a Prevent Medium Removal command of SCSI to the optical disk device 1200 via the interface circuit 1104. In response to this command, the optical disk device 1200 prohibits the removal of the optical disk 1201 from the optical disk device 1200. The removal prohibition of the optical disk 1201 from the optical disk device 1200 is not released until the optical disk device 1200 receives Allow Medium Removal command of SCSI from the host system or the optical disk device 1200 is reset.

The CPU 1101 sets the state corresponding to the (a) partition 4100 in the open table 1108 to "open" at step 5110 as shown in FIG. 6(b), thus terminating the "open" processing at step 5111.

Then, the CPU 1101 writes data. The CPU 1101 transfers data from the main memory 1102 to the disk cache 1103. The CPU 1101 records the data of the disk cache 1103 into the optical disk 1201 of the optical disk device 1200 by using the write-back method. The CPU 1101 transfers data to the disk cache 1103 when a request for the data writing of the program in execution is made, but does not write data into the optical disk 1201. Data is written into the optical disk 1201 after a certain period of time elapses. The optical disk device 1200 is in the removal prohibition state of the optical disk 1201 at this time, the optical disk 1201 is not removed even though the user makes an erroneous request for the removed of the optical disk 1201 from the optical disk device 1200 to the optical disk device 1200.

Subsequently, another partition is opened.

Let it be supposed that data writing into the (b) partition 4200 is necessary when the CPU 1101 is reading out another program from the main memory 1102 into execution. The open processing of the (b) partition 4200 is performed similarly to the (a) partition 4100. The CPU 1101 starts the "open" processing under the read/write mode of the (b) partition at step 5100. Then, the CPU 1101 reads out the disk label 4000, stores it in the disk label storing memory 1106 at step 5101, obtains the UNIX control information 4020 at step 5102, decides as to the mode of "open" at step 5103, makes a decision about the type of the medium at step 5104, and makes a decision as to the set state of the write protecting button at step 5105.

Then, the CPU 1101 takes out the open flag 4032 of the (b) partition from the disk label storing memory 1106, thus deciding as to this state at step 5106. Since the open flag table 4030 is as shown in FIG. 7(b) and the open flag 4032 of the (b) partition is set to "non-use", the CPU 1101 sets the open flag 4032 of the (b) partition on the optical disk 1201 to "in use" at step 5107. At this time, the open flag table 4030 of the optical disk 1201 is as shown in FIG. 7(b).

Then, the CPU 1101 decides as to the state of the open table 1108 at step 5108. The open table is "open" when the open table has a state corresponding to the (a) partition 4100. Since the CPU 1101 detects that the optical disk device 1200 is already in the removal prohibition state of the optical disk 1201, the CPU 1101 sets the state corresponding to the (b) partition 4200 of the open table 1108 to "open" at step 5100, thus terminating the open processing at step 5111.

Then, the CPU 1101 transfers data, to be written into the (b) partition, from the main memory 1102 to the disk cache 1103. At this time, the optical disk 1201 is prohibited from being removed from the optical disk device 1200.

Next, the (a) partition 4100 is closed. The CPU 1101 starts "close" processing of the (a) partition 4100 at step 5300. The CPU 1101 makes a decision as to the state of the access prohibiting flag 1109 at step 5301. Since the access prohibiting flag 1109 is in the state of "access permission", the CPU 1101 writes all data, to be written into the 4100, into the (a) partition of the optical disk 1201 to be accommodated in the optical disk device 1200 by driving the interface circuit 1104 at step 5302.

Then, the CPU 1101 makes a decision as to the mode of "open" of the (a) partition 4100. Since the (a) partition 4100 is opened in the read/write mode, the CPU 1101 sets the open flag 4031 of the (a) partition of the optical disk 1201 to "non-use" at step 5304. More specifically, the CPU 1101 sets the open flag 4031 of the (a) partition of the disk label 4000 already stored in the disk label storing memory 1106 to "non-use" and writes it into the optical disk 1201 accommodated in the optical disk device 1200 as recording data. At this time, the open flag table 4030 of the optical disk 1201 is as shown in FIG. 7(d).

Then, the CPU 1101 sets the state of the (a) partition 4100 of the open table 1108 to the state of "close" as shown in FIG. 6(d) at step 5305. Thereafter, the CPU 1101 makes a decision about the state of each partition of the open table 1108 at step 5306. Since the state of the (b) partition is "open" and as such "in use" as shown in FIG. 6(d), the CPU 1101 terminates the "close" processing at step 5309.

The optical disk 1201 is prohibited from being removed from the optical disk device 1200. Therefore, if the user erroneously makes a request for the removal of the optical disk 1201 to the optical disk device 1200, the optical disk 1201 is not removed.

Let it be supposed that the user turns off the power source of the optical disk device 1200 and then, turns it on. Since the optical disk device 1200 is reset, the removal prohibition of the optical disk 1201 is released.

Since data to be written exists in the disk cache 1103 for a certain period of time, the CPU 1101 issues a WRITE command of SCSI to the optical disk device 1200 via the interface circuit 1104 in order to write this data into the (b) partition 4200 of the optical disk 1201. In response to this command, the optical disk device 1200 reports the Unit Attention state by the resetting of the optical disk device 1200 itself. In response to the report, the CPU 1101 of the host system 1100 starts processing for controlling the replacement of the optical disk at step 5200.

The CPU 1101 makes a decision as to the state of the open table 1108 at step 5201. Since the open table 1108 has a partition which is not in "close" state as shown in FIG. 6(d) and as such the optical disk 1201 is in use, the CPU 1101 reads out the disk label 4000 from the optical disk 1201 and stores it in the main memory 1102 at step 5202.

Thereafter, the CPU 1101 compares with each other the disk identification information 4010 of the disk label 4000 read out and disk identification information of the disk label stored in the disk label storing memory 1106 when the (b) partition 4200 is opened in order to decide whether the former is the same as the latter at step 5203. Since the optical disk 1201 has not been replaced and as such the former is the same as the latter, the CPU 1101 issues to the optical disk device 1200 an instruction indicative of the removal prohibition of the optical disk 1201 at step 5204. Thus, the CPU 1101 terminates the processing for controlling the disk replacement at step 5206.

As described above, since the optical disk device 1200 is set again to the removal prohibition state of the optical disk 1201, the optical disk 1201 is not removal even though the user erroneously makes a request for the removal thereof.

The CPU 1101 writes data into the (b) partition 4200 of the optical disk 1201 after terminating the processing for controlling the disk replacement.

Finally, the (b) partition 4200 is closed. The "close" processing of the (b) partition 4200 is executed similarly to the (a) partition 4100. The CPU 1101 starts "close" processing upon completion of the program at step 5300. Subsequently, the CPU 1101 makes a decision as to the state of the access prohibiting flag 1109 at step 5301, writes data in the disk cache 1103 into the (b) partition 4200 at step 5302, makes a decision as the mode of "open" of the (b) partition 4200 at step 5303, and sets the open flag 4032 of the (b) partition to "non-use" at step 5304. At this time, the open flag table 4030 of the optical disk 1201 is as shown in FIG. 7(e).

Then, the CPU 1101 sets the state of the (b) partition 4200 of the open table 1108 to "close" at step 5303 and makes a decision as to the state of each partition of the open table 1108 at step 5306. At this time, all the partitions of the open table 1108 are in "close" state as shown in FIG. 6(e) and therefore, it is understood that none of the partitions of the optical disk 1201 cannot be used. Accordingly, the CPU 1101 issues a command of Allow Medium Removal of SCSI to the optical disk device 1200 to permit the removal of the optical disk 1201 from the optical disk device 1200 at step 5307. In response to this command, the optical disk device 1200 enables the user to take out the optical disk 1201 thereafter.

Then, the CPU 1101 resets the access prohibiting flag 1109 to "access permission" state at step 5308, thus terminating the "close" processing at step 5309.

In this state, the user can take out the optical disk 1201 from the optical disk device 1200. At this time, all partitions of the optical disk 1201 are closed and all data of the disk cache 1103 have been already written into the optical disk 1201. Therefore, no problems occur even though the optical disk 1201 is taken out. In addition, if the optical disk 1201 is replaced to another since all the partitions of the optical disk 1201 have been already closed, the data of the previously accommodated optical disk 1201 is not written into the currently accommodated optical disk 1201.

Data is written again into the (a) partition of the optical disk 1201.

The (a) partition is opened similarly to the above-described example. When the "open" processing of the (a) partition terminates, the open flag table 4030 of the optical disk 1201 is as shown in FIG. 7(f). At this time, the state of the open table 1108 is as shown in FIG. 6(f).

The CPU 1101 writes data by using write-back method. The CPU 1101 transfers data to the disk cache 1103 when there is a request for data writing of a program in execution, but does not write data into the optical disk 1201.

The user turns off the power source of the optical disk device 1200 and then turns it on again. The optical disk device 1200 is reset and the removal prohibition of the optical disk 1201 is released. The user takes out the optical disk 1201 and puts a different optical disk (not shown) into the optical disk device 1200. At this time, there is data inconsistency in the file system of the (a) partition 4100 of the optical disk 1201 taken out because data which should be written has not been written. The open flag 4031 of the optical disk 1201 remains "in use".

The CPU 1101 issues a Write command of SCSI to the optical disk device 1200 to write data into the (a) partition of the optical disk 1201. In response to this command, the optical disk device 1200 reports Unit Attention state brought about by resetting. In response to this report, the CPU 1101 starts the processing for controlling a disk replacement at step 5200.

The CPU 1101 makes a decision as to the state of the open table 1108 at step 5201. At this time, the open table 1108 has a partition which is not in "close" state as shown in FIG. 6(f) and as such the optical disk 1201 is in use. Therefore, the CPU 1101 reads out the disk label 4000 from the optical disk 1201 and stores it in the main memory 1102 at step 5202.

The CPU 1101 decides at step 5203 as to whether or not the disk identification information 4010 of the disk label 4000 is the same as the disk identification information of the disk label stored in the disk storing memory 1106. Since both are different from each other, it is understood that an optical disk accommodated in the optical disk device 1200 is different from the optical disk 1201 which has been already accommodated in the optical disk device 1200. Therefore, the CPU 1101 sets the access prohibiting flag 1109 to "access prohibition" at step 5205. Thus, the CPU 1101 terminates the processing for controlling the disk replacement at step 5206.

The CPU 1101 does not communicate with the optical disk 1201 when the access prohibiting flag 1109 is set to "access prohibition".

Accordingly, even though the optical disk 1201 is forcibly replaced with a different optical disk when the partition of the optical disk 1201 is being used by opening it, the data which should have been written into the previously accommodated optical disk is not written into into the optical disk 1201 accommodated currently.

Finally, the partition used is closed. Upon termination of the program, the CPU 1101 starts the "close" processing of the (a) partition 4100 at step 5300. Then, the CPU 1101 makes a decision as to the state of the access prohibiting flag 1109 at step 5301. Since the access prohibiting flag 1109 is set to "access prohibition", the CPU 1101 sets the state of the (a) partition 4100 of the open table 1108 to "close" at step 5305 and makes a decision as to the state of each partition of the open table 1108 at step 5306. At this time, as shown in FIG. 6(*g*), all the partitions of the open table 1108 are in "close" state. Then, the CPU 1101 issues an instruction indicating of the removal permission of the optical disk 1201 to the optical disk device 1200 at step 5307. But since the optical disk device 1200 is already in the removal permission state, this operation has no particular meaning. Then, the CPU 1101 sets the access prohibiting flag 1109 "access permission" at step 5308, thus terminating the "close" processing at step 5309.

The case in which the (a) partition 4100 of the optical disk 1201 opened by the host system 1100 and taken out during use is opened again to use it in read/write mode is described below.

The CPU 1101 starts an "open" processing in the read/write mode of the (a) partition 4100 at step 5100. The CPU 1101 reads out the disk label 4000, stores it in the disk storing memory 1106 at step 5101, obtains the UNIX control information 4020 at step 5102, makes a decision as to the mode of "open" at step 5103, makes a decision as to the type of the medium at step 5104, and makes a decision as to the set state of the write protecting button at step 5105.

Then, the CPU 1101 takes out the open flag 4031 of the (a) partition from the disk storing memory 1106 and decides as to the state thereof at step 5106. But in this optical disk 1201, the (a) partition 4100 is not normally closed. Therefore, the open flag 4031 of the (a) partition of the open flag table 4030 remains "in use" as shown in FIG. 7(*f*). This indicates that the inconsistency of the file system exists in the (a) partition 4100. Thus, the CPU 1101 indicates error messages of "Data inconsistency in partition A" and "Read-only file system" at steps 5112 and 5113, thus terminating the "open" processing as abnormal at step 5114.

Therefore, the (a) partition 4100 with the file system having an inconsistency is not opened in the read/write mode and an existing file is not destroyed or the system does not go down.

Then, the file system of the (a) partition 4100 of the optical disk 1201 is corrected.

The user knows the occurrence of the inconsistency of the file system because of the failure of "open" and upon request from the user, the CPU 1101 executes the program in order to correct the file system.

The CPU 1101 starts the correction processing of the file system at step 5400. The CPU 1101 reads out the disk label 4000 from the optical disk 1201, stores it in the disk storing memory 1106 at step 5401, and obtains the UNIX control information 4020 including the map information of the partition at step 5402.

Then, the CPU 1101 checks whether or not the file system of the (a) partition 4100 of the optical disk 1201 has inconsistencies. If inconsistencies is detected, the (a) partition 4100 is corrected into a consistent state at step 5403.

Then, the CPU 1101 decides as to the state of the open flag 4031 of the (a) partition at step 5404. As shown in FIG. 7(*f*), since the open flag 4031 of the (a) partition is set to "in use", the CPU 1101 sets the open flag 4031 of the (a) partition of the disk label 4000 stored in the disk storing memory 1106 to "non-use" and writes the disk label 4000 into the optical disk 1201 at step 5405, thus terminating the processing at step 5406.

The open flag table 4030 of the optical disk 1201 is as shown in FIG. 7(*g*) at this time and the open flag 4031 of the (a) partition is set to "non-use". Therefore, the (a) partition 4100 can be used by opening it again in the read/write mode. Since the inconsistency of the file system of the (a) partition 4100 has been already corrected, the existing file is not destroyed or the system does not go down due to the writing of new data.

Next, the case in which the optical disk 1201 is a writable information recording medium and the write protecting button is set on the write prohibiting side is described below.

Let it be supposed that the CPU 1101 is going to write data into the (a) partition 4100.

The CPU 1101 starts the "open" processing in the read/write mode of the (a) partition 4100 at step 5100. Then, the CPU 1101 reads out the disk label 4000 and stores it in the disk label storing memory 1106 at step 5101, obtains the UNIX control information 4020 at step 5102, and decides as to the mode of "open" at step 5103. Then, the CPU 1101 decides as to the type of the medium at step 5104. Since the optical disk 1201 is a writable medium, the CPU 1101 decides as to the set state of the write protecting button at step 5105. Since the write protecting button is set on the write prohibiting side, the CPU 1101 displays an error message "Read-only file system" to the user at step 5113, thus terminating the "open" processing as abnormal at step 5114.

If the optical disk 1201 is an ROM medium and data cannot be written in the above example, the "open" processing is executed as follows: When the CPU 1101 makes a decision as to the type of the medium at step 5104, and displays an error message "Read-only file system" to the user at step 5113, thus terminating the "open" processing at step 5114.

As described above, the partition of the optical disk 1201 into which data cannot be written is not opened in the read/write mode. Therefore, the system does not go due to mismatch between data of the optical disk 1201 and that of the disk cache 1103.

As apparent from the forgoing description, the removal of the optical disk 1201 from the optical disk device 1200 is controlled according to the open state of the partition, which prevents the destruction of data.

According to the embodiment of the present invention, upon detection of the possibility of the replacement of the optical disk 1201 when the partition has been already opened, whether or not the optical disk 1201 has been replaced is decided by using the disk identification information 4010. If it is decided that the optical disk 1201 has not been replaced, processing continues with the optical disk 1201 prohibited from being removed from the optical disk device 1200. If it is decided that the optical disk 1201 has been replaced, an access to the optical disk accommodated in the optical disk device 1200 is prohibited. Thus, when the optical disk device 1200 is reset during use, the removal of the optical disk 1201 is prohibited again to prevent data from being destroyed. If the optical disk 1201 is forcibly replaced, an access to the replaced optical disk 1201 is prohibited to prevent the destruction of the data of the optical disk.

According to the embodiment of the present invention, the open flag of the optical disk 1201 corresponding to the partition is set to "in use" when the partition is opened and the open flag is set to "non-use" when the partition is closed. When the open flag has been set to "in use" when the partition is opened, the partition is prohibited from being opened in the read/write mode. Thus, even though the optical disk 1201 is forcibly taken out from the optical disk device 1200 during use, data is prevented from being written into a file system having inconsistency. Therefore, existing file is not destroyed or the system does not go down.

Further, the inconsistency of the file system of the partition on the optical disk 1201 taken out during use is corrected and the open flag on the optical disk 1201 is set to "non-use". Thus, the partition is opened again in the read/write mode to safely use the apparatus.

In addition, the partition on the optical disk into which data cannot be written is prohibited from being opened in the read/write mode to prevent the system from going down because of a mismatch between the data on the optical disk and the data on the disk cache.

In the embodiment, the open flag table 4030 is on the disk label 4000, but an open flag corresponding to each partition can be anywhere on the optical disk except the user's access area.

In the embodiment, the user gives an instruction to the CPU 1101 so that the file system is corrected. In this case, the user is requested to perform an operation so that the inconsistency of the file system is corrected and a possible destruction of data due to turn-off of the power source is warned to the user. It is possible that the CPU 1101 automatically corrects the inconsistency of the file system when it has detected the inconsistency in "open" processing. Thus, the "open" processing can be terminated normally, which eliminates the user's operation.

The information recording/reproducing method and apparatus of the present invention can be applied to an apparatus using a removable information recording medium other than an optical disk in the controlling process.

In addition, the information recording/reproducing method and apparatus of the above-described embodiment of the present invention use a disk cache of write-back system, but the information recording/reproducing method and apparatus in which data writing is executed from "open" process until "close" processing.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for recording and reproducing information carried out by an apparatus employing an information recording medium having at least one partition composed of a plurality of files and file management information and a flag area in which an open flag is recorded in one-to-one correspondence with each partition, said open flag setting an in-use state in a partition where logically imperfect file management information is recorded and setting a non-use state in a partition where logically perfect file management information is recorded, said method having a partition opening process conducted before the start of a file recording operation and a partition closing process conducted after the completion of the file recording operation, said partition opening process comprising the steps of:

discriminating the states of the open flags read out from the flag area;

error-terminating said opening process when at least one of the open flags shows the in-use state is detected in said flag discriminating step; and setting the open flag corresponding to the partition to be subjected to the partition opening process to the in-use state when only the open flag shows the non-use state is detected in said flag discriminating step and recording on said flag area, said partition closing process comprising the steps of setting the open flag corresponding to the partition to be subjected to the closing process to the non-use state and recording on said flag area.

2. A method as defined in claim 1, further including a file system restoring process for restoring the file management information in the partition where a logical inconsistency is detected, said file system restoring processing comprising a step of setting the open flag corresponding to the partition where the logic inconsistency is detected to the non-use state and recording on said flag area.

3. An apparatus for recording and reproducing information employing an information recording medium having at least one partition composed of a plurality of files and file management information and a flag area in which an open flag is recorded in one-to-one correspondence with each partition, said open flag setting an in-use state in a partition where logically imperfect file management information is recorded and setting a non-use state in a partition where logically perfect file management information is recorded, said apparatus comprising:

an opening means for conducting the partition opening processing before the start of the file recording and reproducing operation, said partition opening means comprising:

(a) flag discriminating means for discriminating the state of open flags read out from the flag area;

(b) means for error-terminating the partition opening process when said flag discriminating means detects at least one of the open flags showing the in-use state; and (c) means for setting the open flag corresponding to the partition to be subjected to the partition opening process to the in-use state when said flag discriminating means detects only the open flag showing the non-use state and recording on said flag area; and a closing means for conducting the partition closing process after completion of the file recording and reproducing operation, said partition closing means comprising:

means for setting the open flag corresponding to the partition to be subjected to the closing process to the non-use state and recording on said flag area.

* * * * *